(12) United States Patent
Lombard et al.

(10) Patent No.: US 11,865,654 B2
(45) Date of Patent: Jan. 9, 2024

(54) METHOD FOR TIGHTENING A SCREW FOR FASTENING A CONSTRUCTION PANEL TO A SUPPORT

(71) Applicant: SAINT-GOBAIN PLACO, Courbevoie (FR)

(72) Inventors: Pierre Lombard, Aubervilliers (FR); Jean-Yvon Faou, Aubervilliers (FR)

(73) Assignee: SAINT-GOBAIN PLACO, Courbevoie (FR)

( * ) Notice: Subject to any disclaimer, the term of this patent is extended or adjusted under 35 U.S.C. 154(b) by 344 days.

(21) Appl. No.: 17/275,569

(22) PCT Filed: Sep. 4, 2019

(86) PCT No.: PCT/EP2019/073624
§ 371 (c)(1),
(2) Date: Mar. 11, 2021

(87) PCT Pub. No.: WO2020/053052
PCT Pub. Date: Mar. 19, 2020

(65) Prior Publication Data
US 2022/0032411 A1 Feb. 3, 2022

(30) Foreign Application Priority Data
Sep. 13, 2018 (FR) ..................................... 1858251

(51) Int. Cl.
*B25B 23/147* (2006.01)
*B23P 19/06* (2006.01)
(Continued)

(52) U.S. Cl.
CPC .......... *B23P 19/066* (2013.01); *B25B 23/147* (2013.01); *B25B 23/1475* (2013.01); *B25J 11/005* (2013.01); *B25J 15/0019* (2013.01)

(58) Field of Classification Search
CPC . B23P 19/066; B25B 23/147; B25B 23/1475; B25J 11/005; B25J 15/0019
See application file for complete search history.

(56) References Cited

U.S. PATENT DOCUMENTS

| 4,639,996 A * | 2/1987 | Fullmer | ................ B23P 19/065 29/407.03 |
| 2008/0289839 A1* | 11/2008 | Hricko | ................ B25B 23/0064 173/4 |

(Continued)

FOREIGN PATENT DOCUMENTS

DE 196 20 782 A1 12/1996

OTHER PUBLICATIONS

International Search Report as issued in International Patent Application No. PCT/EP2019/073624, dated Dec. 12, 2019.

*Primary Examiner* — Nathaniel C Chukwurah
(74) *Attorney, Agent, or Firm* — Pillsbury Winthrop Shaw Pittman LLP

(57) ABSTRACT

A method for tightening a screw for fastening a construction panel to a support of the construction panel, in which the fastening screw is screwed through the construction panel and then through at least part of the support, includes a monitoring of a change over time of a tightening torque of the fastening screw, with determination of a first maximum torque value and then of a second minimum torque value, and after determination of the second minimum torque value, a stoppage of the tightening of the fastening screw for a torque value, termed stoppage value, corresponding to a third maximum torque value or being determined after an occurrence of a third maximum torque value.

13 Claims, 5 Drawing Sheets

Figure 1:
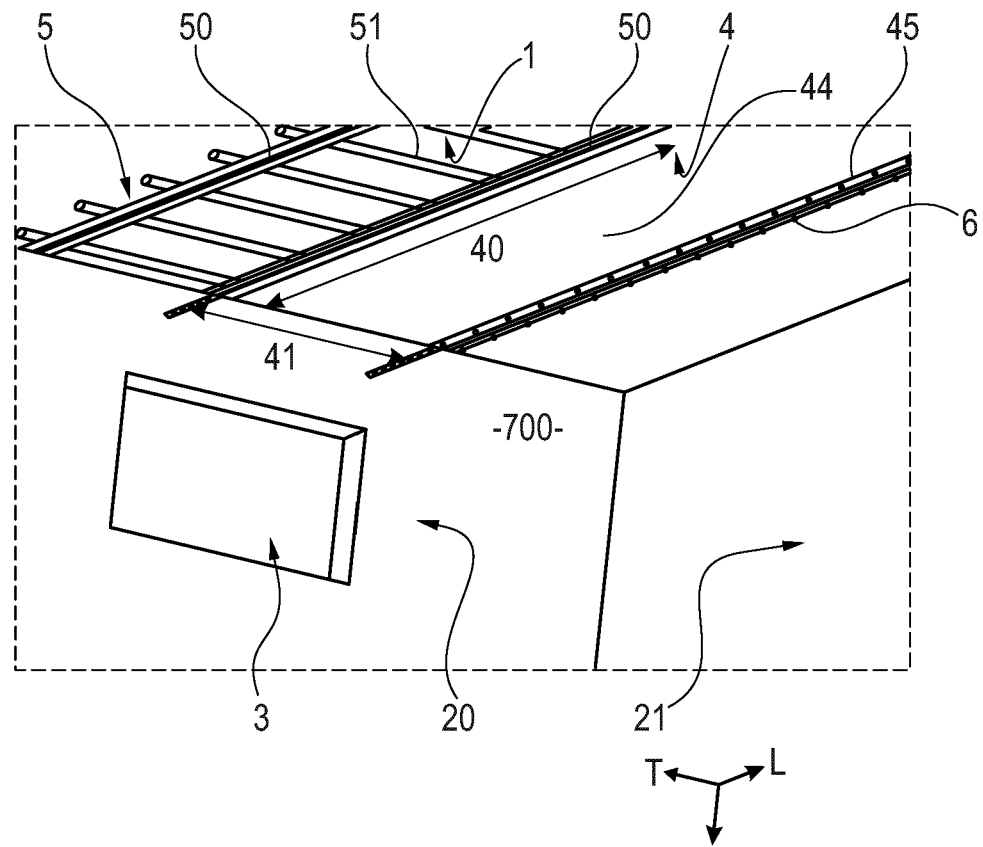

(51) Int. Cl.
*B25J 15/00* (2006.01)
*B25J 11/00* (2006.01)

(56) References Cited

U.S. PATENT DOCUMENTS

| | | | |
|---|---|---|---|
| 2010/0275747 A1* | 11/2010 | Wallgren | B25B 23/14 |
| | | | 81/479 |
| 2011/0000688 A1* | 1/2011 | Iwata | H02P 29/032 |
| | | | 700/170 |
| 2014/0115850 A1 | 5/2014 | Gamboa | |
| 2014/0135987 A1* | 5/2014 | Maischberger | B25J 9/1694 |
| | | | 700/258 |
| 2015/0025538 A1 | 1/2015 | Kust et al. | |
| 2016/0313114 A1* | 10/2016 | Tohme | H04N 13/257 |
| 2019/0321949 A1* | 10/2019 | Miyazaki | B23P 19/065 |
| 2021/0039264 A1* | 2/2021 | Ishizuka | B25J 15/0019 |

* cited by examiner

METHOD FOR TIGHTENING A SCREW FOR FASTENING A CONSTRUCTION PANEL TO A SUPPORT

CROSS-REFERENCE TO RELATED APPLICATIONS

This application is the U.S. National Stage of PCT/EP2019/073624, filed Sep. 4, 2019, which in turn claims priority to French patent application number 1858251 filed Sep. 13, 2018. The content of these applications are incorporated herein by reference in their entireties.

The field of the present invention is that of construction panels used in the building sector. The present invention finds a particularly interesting, but not exclusive, application to construction panels referred to as "plasterboards," formed from a layer of plaster contained between two facing sheets, generally made of cardboard.

Construction panels are widely used in the building industry, for example to make dividers, walls, floors or ceilings, to clad such surfaces, to insulate them thermally and/or acoustically, to protect these surfaces from humidity, or even to line these surfaces. Construction panels are plates made of a material chosen according to its use. For illustrative purposes, mention may be made of construction panels comprising plaster, cement, wood or wood particles, synthetic materials, mixed fibers, mineral particles, or a mixture of these materials; these construction panels can also be covered with a surface coating of a material different from the chosen material.

The construction panels are fastened to a framework which serves as their support. This fastening, which is carried out by means of fastening screws inserted into the framework through the construction panel, ensures that each construction panel is secured to the framework. Typically, the fastening screws pass through the construction panel and are screwed, then tightened, into the framework, so that the heads of the fastening screws are inserted into the thickness of the construction panel, and are flush with the surface of the latter.

The screwing and tightening operations to be carried out may be accompanied by defects which adversely affect the mechanical quality of the fastening and/or the visual appearance of the subsequent finish, for example by application of one or more sealants and/or paints, on the considered construction panel.

A first screwing defect, also referred to as infinite screwing, relates to the case where a fastening screw turns endlessly in the framework. In such a case, the fastening screw in question cannot be tightened in the framework. There is therefore no mechanical strength of the construction panel on the latter.

Another screwing defect relates to the case where a fastening screw fails to penetrate or perforate the material making up the framework of the construction panel. As in the case of infinite screwing, there is then no mechanical strength of the construction panel on its framework. As the screwing force continues, such a situation can lead to a deformation of the framework, which is damaging to the installation of other fastening screws.

Another screwing defect relates to the case where the head of one or more fastening screws protrudes on the surface of the construction panel. The subsequent esthetic finishing operations of this surface then require more time, and for example require resuming screwing or carrying out additional operations in order to obtain a smooth and flat surface which is suitable for receiving a finishing paint.

Another screwing defect denotes a case in which the tightening of a fastening screw is accompanied by a deformation of the material constituting the construction panel. Such a defect most often results in one or more deformations in the thickness of the construction panel, deformations called "plaster hills" when they are encountered for construction panels such as plasterboards, previously mentioned. Like other visual defects, such a screwing defect has a significant impact on the time and cost of finishing the surface of this panel.

The aim of the invention is to propose a solution making it possible to eliminate these mechanical and/or visual screwing defects while guaranteeing reliable and reproducible fastening of the construction panels on the framework.

To this end, the invention relates to a method for tightening a screw for fastening a construction panel to a support of the construction panel, in which the fastening screw is screwed through the construction panel and then through at least part of the support, characterized in that it comprises:
- monitoring a change over time of a tightening torque of the fastening screw, with determination of a first maximum torque value and then of a second minimum torque value, and
- after determining the second minimum torque value, stopping the tightening of the fastening screw for a torque value, termed stoppage value, greater than the first maximum torque value, the stoppage value corresponding to a third maximum torque value or being determined after an occurrence of a third maximum torque value.

The term "tightening" generally designates here, as well as hereinafter, the successive screwing and blocking operations of a fastening screw which lead to the fastening of a construction panel on a support thereof.

According to one aspect of the invention, the fastening screw is screwed through the construction panel and then through at least part of the support by applying a tightening force continuously.

The first torque value is maximum in that it is the highest first value observed during the monitoring over time of the tightening torque. The second torque value is minimum in that it is the lowest observed tightening torque value, except for a start and end value of the method. The stoppage value is greater than the first maximum torque value and occurs after the second torque value.

If a curve is drawn representing the values determined during the monitoring over time of the tightening torque, the first maximum torque value and the second minimum torque value correspond to points on the curve where the derivative vanishes.

The construction panels to which the method according to the invention applies are panels used for example to cover a partition of a building, totally or partially, or to produce a divider separate from a partition, in particular a separating divider. The term "building" is to be understood here in the broad sense and hereinafter can indifferently designate an edifice as a whole, a room or a set of rooms of an edifice. The construction panels targeted by the invention can be of varied nature and dimensions: by way of nonlimiting examples, they can be plasterboard, wood panels or panels made of a composite material, for example made from fragments of wood. Whatever their nature, they are in the general form of a rectangular parallelepiped of small thickness. In other words, these construction panels comprise two main faces that are substantially planar, rectangular and parallel to each other, to within any manufacturing tolerances, separated from each other by a thickness whose dimension is small with regard to the length and width of the aforementioned main faces.

Whatever their nature, the construction panels to which the invention applies are intended to be fastened to a support which is itself either autonomous, in particular in the case of a separating divider, or secured to the partition in question, being arranged for example parallel to this partition, in direct contact with or at a distance from it. Such a partition can be, without limitation, a floor, a wall or a ceiling of a room in this building. With reference to a trihedron L, V, T defined by the conventional spatial orientations, respectively, horizontal, vertical and transverse, the aforementioned partition can therefore be placed horizontally in the case where the considered partition is a floor or a ceiling, vertically in the case where the considered partition is a wall, or according to any combination of these orientations. Furthermore, the considered partition can be either an interior partition or an exterior partition of the building.

The term "support" is understood to mean any rigid element or set of rigid elements forming all or part of a framework suitable for receiving one or more construction panels. The framework can be autonomous, in the sense that construction panels can for example be fastened on either side of such a framework to form a separating divider, or arranged parallel to an existing partition. In the latter case, the support can be fastened against the existing partition by means of screws or by gluing. The support can also be attached at a distance from the partition and held in position, for example, by means of bracing devices fastened to the partition. In a nonlimiting manner, the support can be made of metal, of wood, or of a composite material, for example based on fragments of wood.

By convention, hereinafter the exposed face of the construction panel will refer to the face of the latter which remains visible once the construction panel is fastened on the previously defined support, and the hidden face of a construction panel will refer to the face thereof which is opposite the aforementioned exposed face. The exposed face and the hidden face of a construction panel constitute the aforementioned main faces of this construction panel.

A screw for fastening a construction panel to a support as defined above comprises a threaded part and a conical screw head. The threaded part is substantially cylindrical and it ends, at one of its ends in its main direction of extension, with a conical portion forming a point. At its opposite end in the aforementioned main direction of extension, the threaded part of the fastening screw is attached to the screw head mentioned above. The latter advantageously has a flared shape of revolution which is coaxial with the axis of revolution of the threaded part of the fastening screw.

By convention, the surface of the screw head by which the latter is attached to the threaded part of the fastening screw will be referred to hereinafter as the lower surface of the screw head, the opposite surface of the screw head being, by convention, referred to as the upper surface of the screw head. By extension, the end of the threaded part of the latter forming the aforementioned conical tip will be denoted hereinafter as the lower end of the fastening screw, and the aforementioned upper surface of the screw head will be referred to as the upper end of the fastening screw. Advantageously, the upper surface of the screw head is substantially planar and it comprises a recess configured to receive a tightening tool. Advantageously, the screw head has a conical shape, the diameter of which increases from the threaded part of the fastening screw toward the aforementioned upper surface.

Advantageously, the stoppage value is representative of a position where an upper surface of the head of the fastening screw is coplanar with the main face delimiting the construction panel. Alternatively, this stoppage value may also be representative of a position of the upper surface of the head of the fastening screw included in the construction panel. According to this aspect, the upper surface of the head of the screw is disposed within the thickness of the construction panel, between its main faces.

The stoppage value corresponds to a third maximum torque value or is determined, in particular measured, after an appearance of a third maximum torque value.

This third maximum torque value corresponds to an inversion of the tightening torque curve occurring after the second minimum torque value is determined. Its value is also greater than the first maximum torque value.

This third maximum torque value can be measured. When monitoring the change of the tightening torque, it is determined in the same way as the first maximum torque value and the second minimum torque value. Alternatively, this third maximum torque value can be determined beforehand by tests or by calculation.

The tightening torque here illustrates the force provided to tighten a fastening screw of a construction panel as previously mentioned on a support as previously defined. The tightening torque can, for example, be measured by a tightening torque sensor associated with a tightening tool used to tighten the fastening screws.

In more detail, a fastening screw is first positioned on the exposed face of the construction panel, substantially perpendicular thereto, the point formed at the lower end of the fastening screw being placed in contact with the exposed face. The fastening screw is then inserted through the thickness of the construction panel, until the conical tip punctures the support in which it is to be tightened.

In the case where the construction panel is a plasterboard consisting of a layer of plaster interposed between two facing sheets of cardboard, the fastening screw successively perforates the facing layer forming delimiting a first main face of the construction panel, then the plaster thickness, then the facing layer forming a second main face of the construction panel, before being in contact with the support on which the construction panel is to be fastened.

The fastening screw must thus overcome the resistance of the material forming the facing layers, then that of the material, for example plaster, before overcoming the resistance of the material, for example metal, forming the support on which the construction panel is fastened. The perforation and widening of the support until it substantially reaches the diameter of the threaded part of the fastening screw corresponds to the first maximum tightening torque value.

During this tightening phase, the tightening torque applied to the fastening screw increases progressively, until this first maximum torque value is reached, also referred to below as the perforation value.

During a second tightening phase, the fastening screw is screwed into the support. During this phase, the fastening screw must overcome the resistance to its progression through the thickness of the support of the construction panel. The tightening torque applied to the fastening screw therefore decreases to a second minimum torque value, or tightening value, less than the first maximum torque value previously defined.

As tightening continues, the head of the fastening screw rubs against the main face of the construction panel. Specifically, the lower surface of the screw head abuts against the exposed face of the construction panel. As the tightening continues, the conical shape of the screw head results in a further increase in the tightening force applied to the fastening screw, resulting from the resistance to penetration of the conical part of the screw head in the thickness of the construction panel. There is therefore a rapid increase in the tightening torque applied to the fastening screw, until it reaches a value, termed the stop value, ensuring that the construction panel is correctly secured to its support, without destruction of the construction panel or without deformation likely to generate an esthetic defect. This stop value is determined to be greater than the first maximum torque value.

According to the method of the invention, the tightening operation is stopped as soon as the tightening torque corresponds to this stop value, also called the stoppage value.

According to an advantageous arrangement of the invention and as indicated above, the stoppage value can correspond to or follow a third maximum torque value. In other words, the tightening operation is stopped as soon as the tightening torque is close to the third maximum tightening value, corresponds to a third maximum value of the tightening torque, or has temporally exceeded it.

When the stoppage value corresponds to, or is determined after, the third maximum torque value, the invention ensures that the upper surface of the head of the fastening screw is coplanar with the main face of the construction panel, or at most slightly depressed within the latter. This arrangement prevents any mechanical interference with the head of the fastening screw, as may be the case in the prior art when the latter emerges from the construction panel, for example when the tightening has not been carried out using the means of the invention. The covering of the construction panel with sealant is thus facilitated since the screw does not form an emerging part.

Furthermore, if the upper surface of the head of the fastening screw is driven into the construction panel following a stoppage value of the screwing method determined after the third maximum torque value, the invention guarantees that this depression is light enough not to destroy the component material of the construction panel, such as plaster for example. The covering of the construction panel with sealant is thus done without hindrance, which may be the case when the depression of the fastening screw is too deep within the construction panel.

The stoppage controlled by the method according to the invention ensures a perfect position of the screw head and thus facilitates the subsequent coating step.

The third maximum tightening torque value is greater than the first maximum tightening torque value and the second minimum tightening torque value. The first maximum torque value is greater than the second minimum torque value.

According to one aspect of the invention, the stoppage value is calculated and/or determined beforehand by test, in particular by several tests making it possible to determine an average of the tests which forms the stoppage value.

According to one embodiment, the stoppage value is part of or constitutes a decreasing phase of the tightening torque, such a decreasing phase being after the third maximum torque value.

According to another embodiment, the stoppage value is part of an increasing phase of the tightening torque, such an increasing phase being after the third maximum torque value, the stoppage value nevertheless being less than or equal to the third maximum torque value.

On a practical level, the invention advantageously provides a phase of comparing the tightening torque applied to the fastening screw with the previously defined stoppage value, the tightening stoppage being carried out as soon as the tightening torque reaches the above stoppage value.

The invention advantageously provides for a measurement, at predefined time intervals, of the tightening torque applied to the fastening screw, as well as a comparison to one another of the measured values of this tightening torque. More precisely, the invention provides for the comparison to one another, two by two, of the values of the tightening torque measured consecutively. In other words, the invention provides for a measurement of the tightening torque applied to the fastening screw to be performed at predefined time intervals, and for the last measured value to be compared with the immediately preceding measured value.

Alternatively, the tightening torque measurements making it possible to carry out the aforementioned comparisons can be carried out at intervals of angular values of rotation of the tightening tool, in particular every ⅛ of a rotation.

The invention provides that the above phases of comparing values are replaced by a calculation of the derivative of the curve of the torque values, the first maximum torque value and/or the second minimum torque value being identified by the fact that the derivative is equal to zero at this point on the curve.

The method which is the subject of the invention can thus comprise a step of subtracting two successive tightening torque values separated by a determined time, and where the crossing of the first maximum torque value is determined by a result of this subtraction which is greater than or equal to zero. Such a subtraction step can comprise a step of smoothing the measured torque values.

According to one aspect of the invention, the subtraction step is implemented to determine a crossing of the second minimum torque value, this crossing being determined by a result of the subtraction of two consecutive tightening torque values separated by a determined time, which is less than or equal to zero. During this inversion of the tightening curve, a tightening torque value subsequent to the second minimum tightening value is greater than or equal to a torque value prior to this second minimum torque value, which causes a result less than or equal to zero.

The time interval mentioned here for performing the torque measurements and carrying out the comparisons or subtractions is of the order of a millisecond, guaranteeing reliable sampling of the measurements.

These subtractions make it possible to determine the tightening torque inversions which occur at the first maximum torque value and at the second minimum torque value. By knowing these inversions, the method can identify which stage it is in during the tightening process.

By implementing the steps defined above, the invention makes it possible to avoid any deformation of the construction panel and of its support, while ensuring that the construction panel is correctly fastened thereon. The invention thus makes it possible to overcome the mechanical screwing defects defined above.

Indeed, if the fastening screw does not manage to perforate the support on which the construction panel is to be fastened, for example in the case where the conical tip is blunt, the tightening torque does not reach the previously defined perforation value, from which it is supposed to decrease until reaching the tightening value. It is therefore possible to define a maximum duration beyond which the screwing will be considered to be defective, the tightening torque not having reached the first maximum torque value from which it is supposed to decrease.

If the fastening screw turns in a vacuum, the previously defined stop value is not reached. Here again, it is possible, for example, to define a maximum duration beyond which the screwing will be considered to be defective, the tightening torque not having reached the previously defined stop value.

The invention, as it has just been described, makes it possible to eliminate the main tightening defects which may occur during the fastening of a construction panel on a support of the latter.

The invention also extends to a tightening tool configured to implement a tightening method as has just been described.

Such a tightening tool advantageously comprises a male or female part configured to cooperate with the recess made in the upper surface of the fastening screw, in order to ensure the engagement of the tightening tool on the latter. Advantageously, the male or female part of the tightening tool has a main axis of elongation around which it is movable in rotation. When implementing the method according to the invention, the tightening tool and the fastening screw to which it is applied are arranged such that the axis of rotation of the male or female part of the tightening tool, designated by extension hereinafter as the axis of rotation of the tightening tool, is substantially coincident with the axis of revolution of the threaded part of the considered fastening screw. Thus, when the tightening tool is driven in rotation about its axis of rotation to carry out the method according to the invention, the male part which it comprises drives the fastening screw in rotation about its axis of revolution.

The invention also extends to a device for tightening a fastening screw intended to fasten a construction panel on a support of the latter, the aforementioned tightening device comprising a tightening tool as described above, the tightening device being equipped with a system for measuring the tightening torque applied to the aforementioned fastening screw and a device for stopping the tightening tool as a function of the measured tightening torque, in particular for a torque value, called stoppage value, greater than a first maximum torque value and determined after a second minimum torque value.

The system for measuring the torque of the tightening tool may comprise at least one means for detecting the first maximum torque value and/or the second minimum torque value and/or a third maximum torque value.

According to various embodiments of the invention, the system for measuring the tightening torque is, for example, mechanical or electronic. It may for example be a torque sensor or a sensor of the electrical intensity consumed by the tightening tool.

According to one embodiment, the device for stopping the tightening tool is a member which cuts off the power supply to the tightening tool. The device for stopping the tightening tool can also be a mechanical means for locking or disengaging the rotation of the tightening tool.

Advantageously, the tightening device according to the invention can also have one or more of the following features, taken separately or in combination:
  the tightening device according to the invention comprises a damping system configured to compensate for variations in the speed of movement of a thrust plate constituting the tightening device. The presence of the damping system defined above makes it possible to compensate or remove these variations in the descent speed of this thrust plate by homogenizing the force exerted on the upper surface of the head of the fastening screw and by guaranteeing permanent contact between the recess made in the latter and the male or female form of the tightening tool,
  the damping system comprises, on the one hand, at least one threaded rod having a main axis of elongation about which it is driven in rotation by a translation motor of the tightening tool, at least one threaded rod being configured to drive the thrust plate in translation in a direction substantially parallel to the axis of rotation of the threaded rod, and on the other hand, a spring disposed between the thrust plate and the aforementioned tightening tool. It should be noted that, in the case where the damping system comprises several threaded rods, these are advantageously parallel to each other. The thrust plate linked to at least one threaded rod is driven in translation in a direction substantially parallel, within manufacturing tolerances, to the direction of the common axis of rotation of the threaded rod or rods. Advantageously, this common axis of rotation is parallel to the axis of rotation common to the tightening tool, that is to say, to the direction in which the fastening screw is inserted into the construction panel. It follows from the above that, in its translational movement, the thrust plate exerts a force, directed in the direction of the axis of rotation of the tightening tool, on the spring placed between the thrust plate and the tightening tool. The aforementioned spring then exerts, in turn, a force on the tightening tool. Advantageously, two threaded rods and two springs are arranged symmetrically with respect to the axis of rotation of the tightening tool.

The invention also extends to a portable tool with manual control which comprises a tightening device as mentioned in this document. It may for example be a screwdriver, for example cordless, equipped with a system for measuring the tightening torque applied to the fastening screw, for example a tightening device of the torque wrench type.

The invention also covers a screwing robot which comprises a tightening device as mentioned in this document. This screwing robot comprises at least one base configured to be secured to a floor and is equipped with an arm at one end of which the tightening tool is placed, the movements of the tightening tool and of the arm which carries it being governed by an electronic control unit. Such a screwing robot is a heavy industrial means used in the context of repetitive screwing operations.

The invention finally extends to an automated device configured to move resting on a construction panel, the automated device comprising a frame carrying a tightening device as has just been described, configured to perform at least one operation of fastening the construction panel on a support of the construction panel, the automated device comprising at least one member for retaining the automated device against the construction panel and at least one means for setting the automated device in motion along the construction panel.

It should be understood here that the automated device according to the invention moves against the exposed face, previously defined, of the construction panel, and that in this movement, the automated device according to the invention remains in permanent contact with this face, regardless of the spatial orientation of the construction panel. This permanent contact is ensured by the retaining member which is formed, for example, by a suction member, the latter comprising at least one sealing device and a plate constituting the frame, which delimit a vacuum chamber. Once the automated device is pressed against the construction panel, the vacuum chamber is closed by the exposed face of this panel against which the automated device is placed, the suction member moreover comprising a depressurizing means opening into the aforementioned vacuum chamber.

According to one embodiment of the invention, the means for setting the automated device in motion comprises a motor for setting in motion, for example an electric motor supplied with current by a domestic network or by an electrical storage device on board the frame. The latter advantageously comprises one or more movement means such as, by way of nonlimiting examples, wheels, tracks or feet.

Advantageously, the automated device comprises a control unit configured to control the operation of the retaining member, the operation of the means for setting in motion, as well as the operation of the tightening device configured to implement the method according to the invention, including the control of a damping system as previously described.

Figure 2:
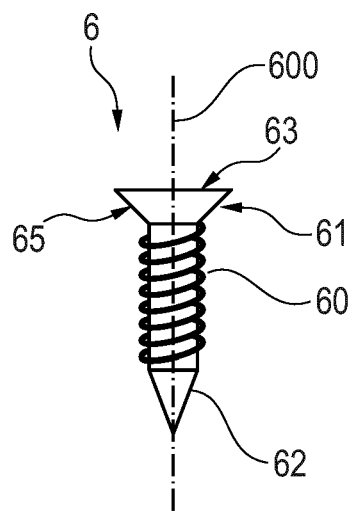
Figure 3:
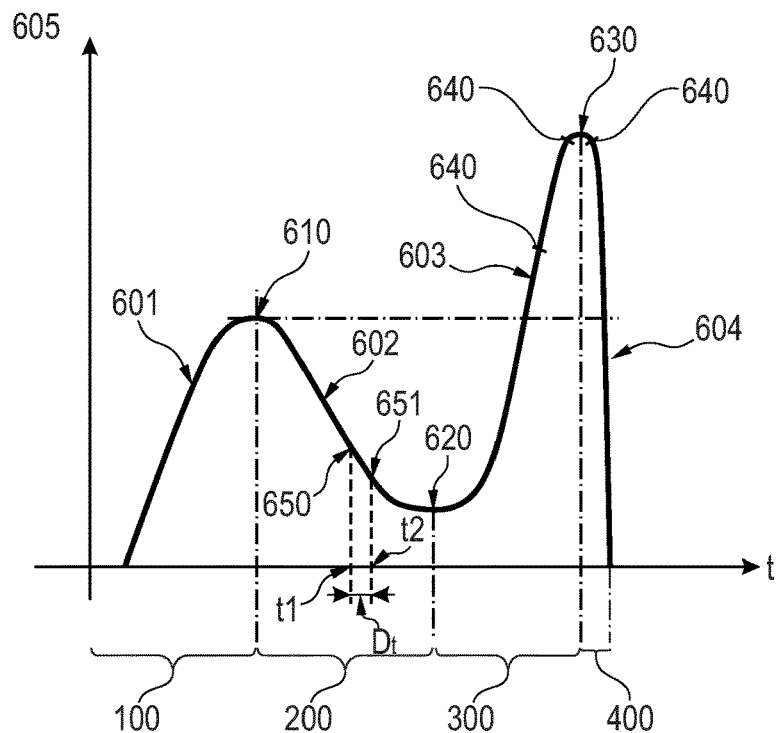
Figure 4:
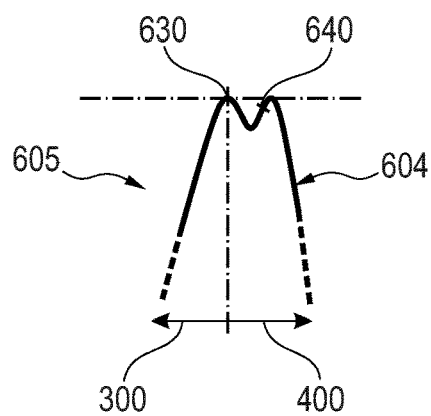
Figure 5:
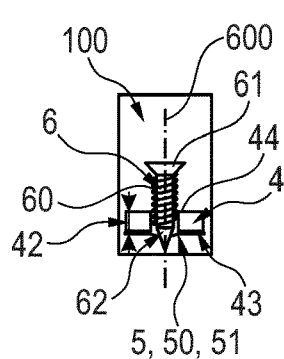
Figure 6:
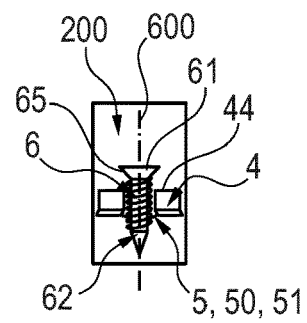
Figure 7:
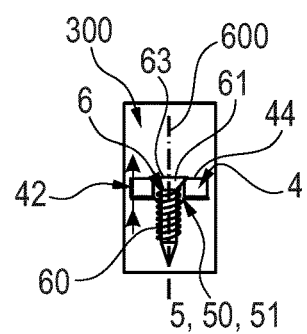
Figure 8:
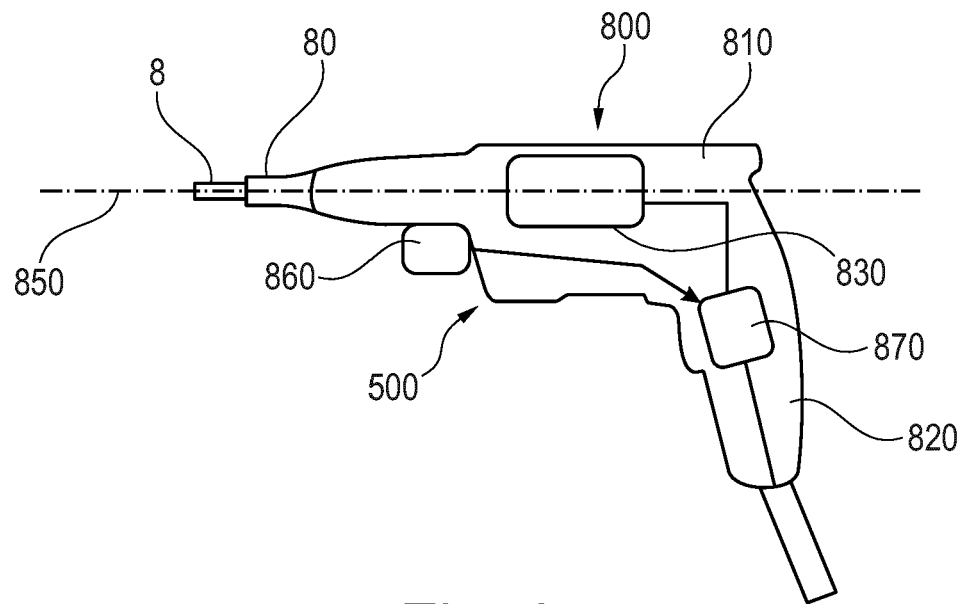
Figure 9:
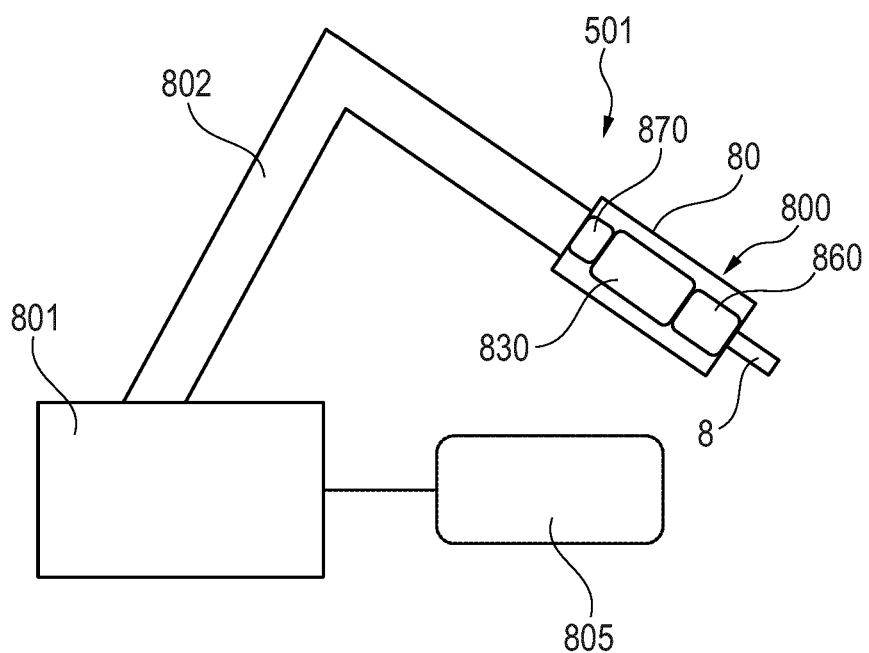
Figure 10:
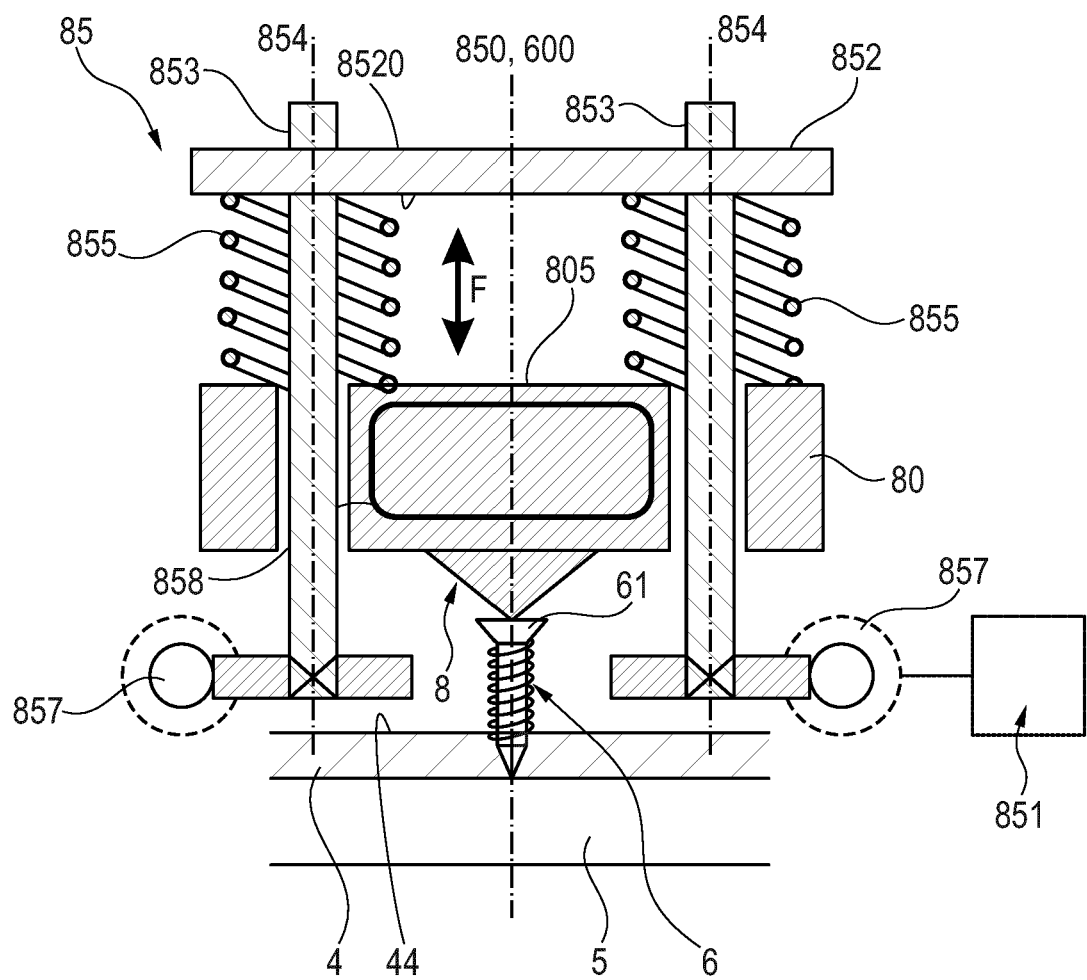
Figure 11:
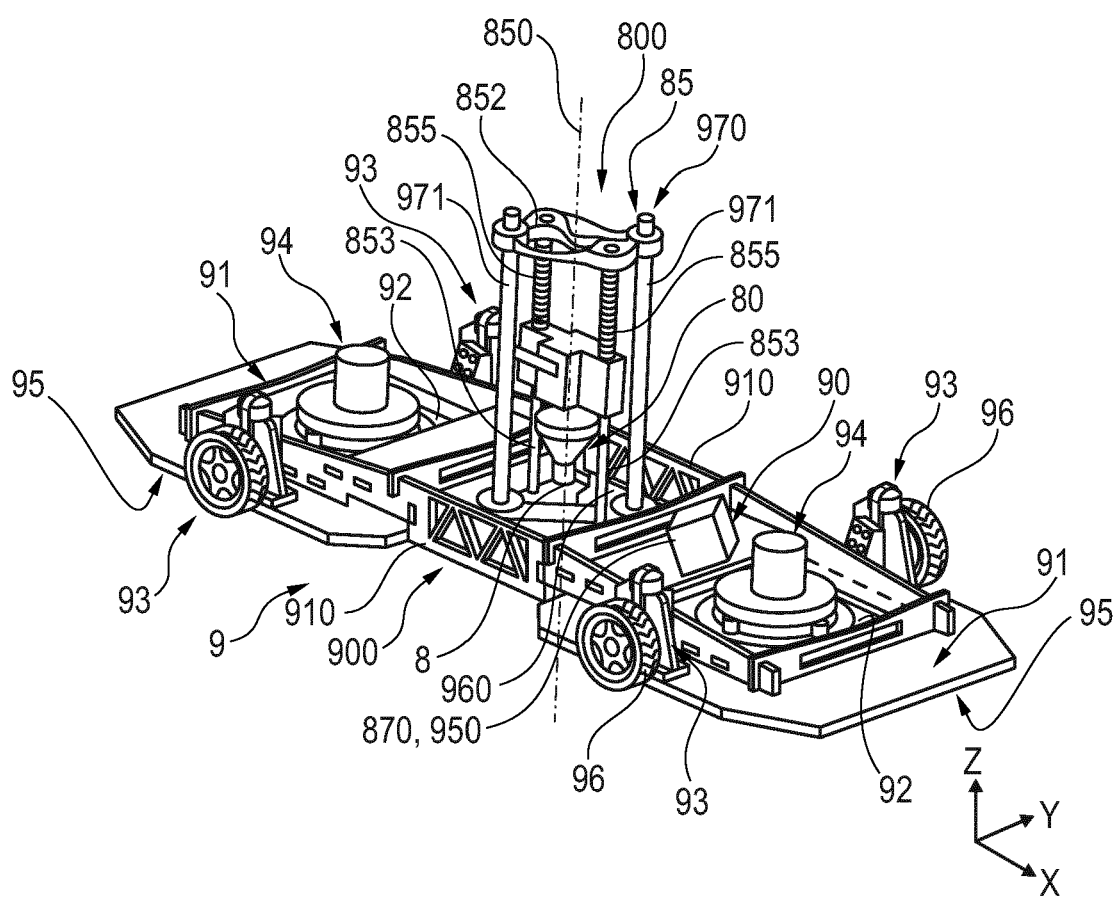

Other features, details and advantages of the invention will emerge more clearly on reading the description given below by way of indication, in relation to the following drawings, in which:

FIG. 1 is a schematic perspective illustration of an application context of the invention, FIG. 2 is a schematic sectional view of a fastening screw, along a plane containing its axis of revolution, FIG. 3 is a curve illustrating the variations in the tightening torque applied to a fastening screw during the implementation of the method for fastening a construction panel to its support, FIG. 4 is an enlargement of part of the curve according to FIG. 3 illustrating a method of determining the stoppage value, FIGS. 5, 6, and 7 illustrate various relative positions of a fastening screw, of a construction panel and of the support thereof during the different steps of the method according to the invention illustrated by FIG. 3, FIG. 8 is a schematic view of a first embodiment of a tightening device according to the invention, FIG. 9 is a schematic view of a second embodiment of a tightening device according to the invention, FIG. 10 is a schematic sectional view illustrating a damping system according to the invention, and FIG. 11 is a schematic perspective view of an automated device according to the invention.

It should first of all be noted that while the figures set out the invention in detail for its implementation, these figures can of course be used to better define the invention where appropriate. It should also be noted that like elements are designated by like references in all of the figures.

FIG. 1 illustrates a general application context of the method which is the subject of the invention. This figure schematically shows part of a room 700 of a building, seen from the inside. FIG. 1 shows a ceiling 1, as well as two walls, respectively 20, 21, of the room 700. FIG. 1 also shows a direct trihedron (L, T, V) representing the three spatial directions, respectively a horizontal direction L, a vertical direction V, and a transverse direction T. FIG. 1 also schematically shows an opening 3 arranged in the wall 20: the opening 3 may, for example, be intended to receive a window. The room 700 advantageously comprises one or more other walls, as well as a floor, not shown in FIG. 1.

The ceiling 1 and the walls 20, 21 each form a partition of the room 700, intended to be covered by one or more construction panels 4. Hereinafter, the invention will be described and illustrated in the context of a construction panel 4 intended to be fitted against any one of the aforementioned partitions, it being understood that the elements and features described for such a construction panel 4 apply to any construction panel 4 intended to be attached to a support independent of a partition, as is the case with a separating divider.

According to various examples, the construction panel 4 may comprise a layer of plaster sandwiched between two facing sheets, thus constituting a panel known by the name of plasterboard. The construction panel 4 can also be made of wood or of a composite material comprising fragments of wood assembled together, for example by a resin.

In all cases, whatever the material chosen, the construction panel 4 is advantageously a plate whose general shape is substantially that of a rectangular parallelepiped, whereof a length 40, partially shown in FIG. 1, and a width 41 are large compared to the thickness 42, visible in FIGS. 5 to 7, measured perpendicular to the length 40 and the width 41 above. Typically, the length 40 and the width 41 of such a construction panel 4 vary from a few tens of centimeters to a few meters, and the thickness 42 of such a panel 4 is of the order of a few millimeters to a few centimeters.

The construction panel 4 comprises a first main face, or inner face 43, visible in FIG. 5, and a second main face 44, or exposed face, which are substantially rectangular and parallel to each other, each having the aforementioned length 40 and width 41, separated from each other by the previously defined thickness 42. The second main face 44 is the face of the construction panel 4 which is intended to remain visible from the inside of the room 700: it will also be designated hereinafter as the exposed face of the construction panel 4. The inner face 43 is the face of the construction panel 4 opposite the aforementioned second main face 44: it will be designated hereinafter as the hidden face of the construction panel 4.

According to different embodiments, the support 5 can be metallic, it can be synthetic, it can be wood, or it can be formed from a composite material, for example based on fragments of wood and a resin. Irrespective of its component material, the support 5 is a rigid element either secured to the partition, for example by screws, bolts, clips, hangers or gluing to it, or independent of this partition to form a separating divider separate from the partition.

According to various embodiments, the support 5 may be in the form of one or more rectilinear rails, for example of square or rectangular section along a plane perpendicular to their main direction of elongation. Advantageously, these rails can be arranged in a network on the partition intended to receive the construction panel, so as together to form a mesh thus constituting a support framework 5 for the construction panel or panels 4.

According to the embodiment more particularly illustrated by FIG. 1, the support 5 comprises a first set of rails 50 and a second set of uprights 51, otherwise called furring. The rails 50 of the first set and the uprights 51 of the second set are substantially perpendicular to each other. The rails 50 and the uprights 51 thus form a network of bars constituting the framework secured to the ceiling 1 or to the wall 20, 21, on which framework the construction panels 4 are intended to be fastened.

As shown in FIG. 1, the construction panel 4 is advantageously fastened to the rails 50 of the first set of rails, for example by a set of fastening means 6. It follows from the foregoing that a fastening means 6, for example a screw inserted, in the vertical direction V, in the vicinity of an edge 45 of the construction panel 4, passes through the construction panel 4 and penetrates into the one of the rails 50. It should be noted that certain fastening means 6 can be inserted into one of the uprights 51 without this harming the invention. Furthermore, the direction of the fastening means 6 is vertical, but it is understood that the invention applies to a tightening of a fastening means arranged horizontally.

The fastening means 6 are advantageously fastening screws, one of which is schematically shown in FIG. 2.

Referring to FIG. 2, a fastening screw 6 comprises a threaded part 60 which extends mainly in the direction of a main axis of revolution 600, and a head 61 of the fastening screw 6. At one of its ends in the direction of the aforementioned axis of revolution 600, designated as the lower end of the fastening screw 6, the threaded part 60 comprises a conical tip 62, which is coaxial with the axis of revolution 600.

At its opposite end in the direction of the axis of revolution 600, the threaded part 60 is attached to the head 61 of the fastening screw 6. The latter has a conical shape, the axis of which coincides with the previously defined axis of revolution 600, which thus forms an axis of rotation of the fastening screw 6 as a whole. In contrast to the portion by which it is attached to the threaded part 60, the head 61 of the fastening screw 6 has a substantially planar surface 63, hereinafter referred to as the upper surface 63 of the fastening screw 6. The conical shape of the head 61 of the fastening screw 6 has a surface 65 which joins the threaded part 60 to the upper surface 63 of the head 61 of the fastening screw 6.

The upper surface 63 substantially assumes the shape of a disc whose diameter is greater than the diameter of the threaded part 60. Advantageously, the upper surface 63 comprises a recess configured to receive a tightening tool 8, illustrated in FIGS. 8 to 11. When tightening the fastening screw 6, the tightening tool 8 drives the fastening screw 6 in rotation about its previously defined axis of rotation 600: owing to the thread of the threaded part 60, the latter then progresses in translation within the material in which it is inserted.

FIG. 3 illustrates the method which is the subject of the invention. It shows a curve illustrating the variations of the tightening torque 605 applied to a fastening screw 6 during a tightening method according to the invention.

It should be understood that here, tightening means all the phases leading to a stable mechanical connection of the construction panel 4 on its support 5, in which the relative degrees of freedom of the construction panel 4 and of the support 5 are zero after tightening all the fastening screws 6 used to fasten the construction panel 4 on the support 5.

FIG. 3 shows, on the abscissa, the time t, and on the ordinate, the tightening torque 605 applied to the fastening screw 6. It should be noted that this curve illustrates the variation tendencies of the tightening torque 605 and that slight deviations from the envelope shown in FIG. 3 may occur, for example under the effect of variations in the homogeneity of the materials which constitute the construction panel 4 and the support 5.

The curve in FIG. 3 illustrates monitoring of a change over time of a tightening torque of the fastening screw 6. This monitoring is done by a torque measurement system, and the latter is able to determine the appearance of a first maximum torque value 610 and of a second minimum torque value 620, subsequent to the first maximum torque value 610. According to the invention, the method monitors a torque value, called the stoppage value 640, which is greater in value than the first maximum torque value 610 and which is determined successively at the second minimum torque value 620.

In the example illustrated in FIG. 3, the method provides that the tightening force is applied continuously, that is to say, without interrupting the rotation from the setting in rotation of the fastening screw 6 until the stoppage value 640 occurs.

According to an advantageous embodiment described in more detail below, this stoppage value 640 corresponds to or follows a third maximum torque value 630. Once this stoppage value has been determined, the method orders a stop in the tightening of the fastening screw.

In its general formulation, the invention nevertheless provides for stopping the tightening for a stoppage value 640 occurring before a third maximum torque value 630 occurs, as long as this stoppage value 640 is after the second minimum torque value 620 and is greater in value than the first maximum torque value 610.

FIGS. 5, 6 and 7 illustrate various relative positions of the fastening screw 6, of the construction panel 4 and of the support 5 during the various steps of the method according to the invention.

In a first step 100 of tightening the screw 6 according to the invention, illustrated by a first portion 601 of the curve shown in FIG. 3, the tightening torque 605 applied to the fastening screw 6 increases to a first maximum torque value 610, or perforation value.

As mentioned previously and as illustrated by FIG. 5, the first tightening step 100 corresponds to the passage of the fastening screw 6 through the thickness 42 of the construction panel 4, then to the perforation of the support 5 by the fastening screw 6. More precisely, during this first step 100, the fastening screw 6 is first of all positioned on the construction panel 4, in line with a rail 50 or an upright 51 of the support 5. The tightening tool 8, visible in FIGS. 8 to 11, is put into operation in such a way that it drives the considered fastening screw 6 in rotation about its axis of revolution 600. Until the tightening tool 8 is put into operation, the tightening torque 605 applied to the fastening screw 6 in question is zero.

Under the effect of the rotation driven by the tightening tool 8, the tip 62 formed at the lower end of the fastening screw 6 first perforates the second main face 44, or exposed face, of the construction panel 4. Under the effect of its rotation about its axis of revolution 600 and owing to its threaded part 60, the fastening screw 6 then progresses through the thickness 42 of the construction panel 4, until the tip 62 perforates the inner surface 43, or hidden face, of the construction panel 4. The tip 62 of the fastening screw 6 is then in contact with one of the rails 50 or uprights 51, previously defined, of the support 5, which it in turn perforates.

During this first tightening step 100 illustrated in FIGS. 3 and 5, it follows from the nature and mechanical properties of the various materials making up the construction panel 4 and the support 5 that, on the one hand, the tightening torque 605 increases continuously when the fastening screw 6 punctures, then passes all the way through the construction panel 4, and when, on the other hand, the first value 610 of the tightening torque 605 is reached during the perforation and during the enlargement of the hole made in the material making up the support 5, which has the highest resistance to penetration at this stage of the method.

The method determines the existence of this first maximum torque value 610 by implementing a step of subtracting torque values at determined time intervals, in particular of the order of a millisecond. The result of this subtraction determines the attainment of the first maximum torque value 610 and the passage from the first step 100 to a second step 200. According to this determination method, a step of subtraction t1–t2 of two successive tightening torque values t1 and t2 is carried out. The torque value illustrated by reference t2 is temporally consecutive to the torque value illustrated by reference t1 and separated from t1 by a determined non-zero time. This time corresponds for example to the sampling time of the torque values, in particular of the order of a millisecond. The crossing of the first maximum torque value 610 is determined by a result of this subtraction t1–t2 which is greater than or equal to zero.

According to another example, the existence of the first maximum torque value 610 can be determined from angular measurement of the rotation of the tightening tool, in particular when the motor which drives the tightening tool is an electric stepper motor.

According to yet another example covered by the invention, the first maximum torque value 610 is a point, in a set of points forming a change curve of the tightening torque, where the derivative vanishes.

In this second tightening step 200, illustrated by a second portion 602 of the curve shown in FIG. 3 and in FIG. 6, the tightening torque 605 applied to the fastening screw 6 decreases, up to a second minimum torque value 620, or screwing value. This second minimum torque value 620 is less than the first maximum torque value 610.

During this second step 200, the fastening screw 6 is progressively screwed into the support 5, that is to say that, under the effect of the rotation imparted by the tightening tool 8, it progresses within the support 5 in the direction of its axis of revolution 600. The resistance to the progression of the fastening screw 6 within the support 5 being lower than the resistance to perforation of the support 5 by the tip 62 of the fastening screw 6, the tightening torque 605 applied to the fastening screw 6 decreases from the first maximum torque value 610 previously defined, until the lower surface 65 of the head 61 of the fastening screw 6 comes into contact with the second main face 44 of the construction panel 4.

The method determines the existence of this second minimum torque value 620 by implementing the step of subtracting torque values t1 and t2 as detailed above with respect to the first maximum torque value 610. The result of this subtraction determines the attainment of the second minimum torque value 620 and the passage from the second step 200 to a third step 300, when the result of the subtraction t1–t2 is less than or equal to zero.

According to another example, the existence of the second minimum torque value 620 can be determined from angular measurement of the rotation of the tightening tool, in particular when the motor which drives the tightening tool is an electric stepper motor.

According to yet another example covered by the invention, the second minimum torque value 620 is a point, in a set of points forming a change curve of the tightening torque, where the derivative vanishes.

In the third tightening step 300 of the method according to the invention, illustrated by a third portion 603 of the curve shown by FIG. 3 and by FIG. 7, the tightening torque 605 applied to the fastening screw 6 in question increases again to exceed the first maximum torque value 610.

According to a first embodiment of the invention, a stoppage value 640 determines a stoppage in the tightening of the fastening screw. This stoppage value 640 can assume any tightening torque value greater than the first maximum torque value 610, as long as this stoppage value appears after the second minimum torque value 620.

In the example illustrated in FIG. 3, the tightening torque 605 applied to the fastening screw increases to a third maximum torque value 630.

According to an advantageous embodiment of the invention, the method is able to determine the appearance of this third maximum torque value 630, either by comparison of successive torque values measured instantaneously, or by carrying out a derivative of these torque values. This third maximum torque value 630 can also be calculated or even result from tests, and thus form a threshold with which the measurement of the torque done during monitoring performs a comparison.

During this third step 300, under the effect of the rotation of the fastening screw 6, the head 61 of the fastening screw 6 penetrates into the thickness 42 of the construction panel 4, progressively locking the latter against the support 5. Due to the conical shape of the head 61 of the fastening screw 6 and the relative dimensions thereof with respect to the threaded part 60 of the fastening screw 6, the tightening torque 605 applied to the fastening screw 6 increases rapidly during this third step 300, from the second minimum torque value 620, which therefore constitutes a minimum during operation, as shown on the curve illustrated in FIG. 3.

To avoid any mechanical deformation of the construction panel 4 and/or of the support 5 by excessive screwing, which is damaging to the mechanical strength of the assembly formed by the construction panel 4 and the support 5, as well as to the esthetics of the subsequent finishing of the second main face 44 of the construction panel 4, the tightening of the fastening screw 6 should advantageously be stopped when the upper surface 63, previously defined, of the head 61 of the fastening screw 6 is flush with the second main face 44 of the construction panel. It has been determined that this third maximum torque value 630, or values which are close to it, before or after this third maximum torque value 630, are typically representative of a position of the fastening screw 6 where its upper surface 63 is coplanar with one of the main faces 43, 44, that is to say, the exposed face 44 which delimits the construction panel 4. This third maximum torque value 630 may also correspond to an inclusion in the construction panel 4 of the upper surface 63 of the fastening screw 6, such an inclusion being a positioning of this upper surface 63 between the two main faces 43, 43 which delimit the construction panel 4.

To do this, the method according to the invention comprises a fourth stoppage step 400 illustrated by a fourth portion 604 of the curve shown in FIG. 3. During the fourth step 400, the tightening of the fastening screw 6 in question is stopped as soon as the third maximum torque value 630 of the tightening torque 605 applied to the fastening screw 6 is approached, reached or exceeded in time by the stoppage value 640. The tightening torque 605 then drops to return to a zero value, corresponding to stopping the rotation of the fastening screw 6. It therefore follows from the above that the third maximum torque value 630 is a maximum value of the tightening torque 605 during the tightening method according to the invention.

FIG. 3 also shows that the stoppage value 640 can either correspond to the third maximum torque value 630, or can precede it along a torque curve which increases toward the third maximum torque value 630, or follow it along a decreasing torque curve. The stoppage value 640 can thus form part of an increasing phase of the tightening torque 605, such an increasing phase of the tightening torque being prior to the third maximum torque value 630. The stoppage value 640 can also form part of a decreasing phase of the tightening torque 605, such a decreasing phase of the tightening torque being after the third maximum torque value 630.

When the stoppage value 640 corresponds to the third maximum torque value 630 or follows it during the decreasing phase of the torque curve, the upper surface 63 of the fastening screw 6 is then coplanar with the second main face 44 of the construction panel 4. The presence of the fastening screw 6 therefore does not create any mechanical interference if a covering of the construction panel 4, for example by sealant, must be carried out.

When the stoppage value 640 follows the third maximum torque value 630, the invention also provides that the upper surface 63 of the fastening screw 6 is slightly depressed into the thickness 42 of the construction panel 4. Such a depression is done so as not to tear the facing layer of the construction panel, the latter possibly for example being a cardboard sheet. Furthermore, the depth of the head 61 of the fastening screw 6 in the thickness of the panel is not restrictive in the event of coating the construction panel 4 with sealant, in the sense that it does not generate air bubble-forming cavities.

Alternatively and as illustrated by FIG. 4, the stoppage value 640 can either correspond to the third maximum torque value 630, or follow it along a torque curve which increases, as long as the stoppage value 640 remains less than or equal to the third maximum torque value 630.

As shown in FIG. 3, the third maximum value 630 of the tightening torque is greater than the first maximum torque value 610, that is to say, the maximum reached by the tightening torque 605 when the head 61 of the fastening screw 6 is blocked in the thickness 42 of the construction panel 4 is greater than the maximum reached during the perforation of the support 5 by the tip 62 of the fastening screw 6.

According to an advantageous embodiment, the first maximum torque value 610, the second minimum torque value 620 and the third maximum torque value 630 mentioned above result directly from torque measurements carried out in situ, that is to say, during monitoring of the change over time of the tightening torque of the fastening screw 6.

According to other embodiments, the third maximum torque value 630 can be defined by a calculation, depending on the size of the fastening screws 6 and the mechanical properties of the materials making up the fastening screws 6, the construction panel 4 and the support 5. The third maximum torque value 630 can also be defined empirically, for example when tightening one or more "control" fastening screws 6 before tightening all the screws necessary to fasten the entire considered construction panel 4 on the support 5. In these two cases, the third maximum torque value 630 forms a threshold that the torque value measured instantaneously during the third step 300 of the method must reach or exceed in order to stop the tightening.

In all cases, it follows from the foregoing that the method according to the invention advantageously comprises a step of comparing values of the tightening torque 605, measured at different predefined instants t, this comparison step verifying at least that the stoppage value 640 is after the second minimum torque value 620 and that its value is greater than the first maximum torque value 610, the performance of the fourth step 400 of the method according to the invention being governed by the result of this comparison.

It follows from the foregoing that the method can alternatively be understood as that which comprises a step of tightening the fastening screw 6 during which a tightening torque of this screw is monitored, a first step 100 of tightening the screw 6 until the tightening torque 605 applied to the fastening screw 6 reaches a first maximum torque value 610, a second step 200 of tightening the fastening screw 6 until the tightening torque 605 applied to the fastening screw 6 reaches a second minimum torque value 620, the first maximum torque value 610 being greater than the second minimum torque value 620, a third step 300 of tightening the fastening screw 6 until the tightening torque 605 applied to the fastening screw 6 reaches a third maximum torque value 630, and a fourth step 400 of stopping the tightening of the fastening screw 6 when a torque stoppage value 640 applied to the fastening screw 6 is close to, reaches or exceeds the third maximum torque value 630.

It also follows from the foregoing that the method according to the invention provides for comparing, for example by subtraction, at time intervals Dt defined beforehand, the values, respectively referenced 650, 651, of the tightening torque 605 applied to the fastening screw 6 at times t1 and t2 separated from each other by the time interval Dt. In other words, the invention provides for measuring, at time intervals Dt, the tightening torque 605 applied to the considered fastening screw 6, as well as comparing the value 651 of the tightening torque, measured at a given instant t2, with the value 650 of the tightening torque, measured at the preceding instant t1. The passage of the tightening torque values 605 thus measured by the first maximum torque value 610 thus provides information on the start of the second step 200 of the tightening method according to the invention, then the passage through the second minimum torque value 620 provides information on the start of the third step 300 of the method according to the invention.

Alternatively, a derivative of the measured torque values can also make it possible to determine the increasing or decreasing aspect of the torque curve 605, and thus to determine the crossing of the first maximum torque value 610, of the second minimum torque value 620 and, optionally, the third maximum torque value 630. The curve in FIG. 3 showing the values determined during the monitoring over time of the tightening torque, the first maximum torque value 610 and the second minimum torque value 620, possibly the third maximum torque value 630, correspond to points of the curve where the derivative vanishes.

FIG. 8 and FIG. 9 schematically illustrate two embodiments of a tightening device 800 configured to implement the method according to the invention as it has just been described.

FIG. 8 is a portable tool with manual control 500 which comprises a tightening device 800 as described above. Such a portable tool with manual control 500 comprises a screwing head 80 configured to receive a tightening tool 8 which itself is configured to fit into the recess made in the upper surface 63 of the head 61 of the fastening screw 6, not shown in FIG. 8. According to an advantageous embodiment, the screwing head 80 is configured to receive various tightening tools 8, the shape of which is complementary to various shapes of recesses arranged in the head 61 of the fastening screw 6, the various tightening tools 8 being interchangeable in the screwing head 80 depending on the shape of the aforementioned recess.

The portable tool with manual control 500 according to the invention is advantageously formed by a body 810 provided with a gripping handle 820. The tightening device 800 advantageously comprises a motor 830, for example an electric motor placed in the body 810 of the tightening device 800. According to various embodiments, the electric motor 830 can be supplied with current by a domestic network, or it can be supplied with current by a storage device 840, not shown in FIG. 8, for example nested on a part of the body 810 of the tightening device 800.

The electric motor 830 drives the tightening tool 8 carried by the screwing head 80 in rotation, about an axis of rotation 850 of the aforementioned tightening tool 8. For the implementation of the method according to the invention, the tightening device 800 is positioned such that the aforementioned axis of rotation 850 is substantially coincident with the axis of a fastening screw 6 of a construction panel 4 on a support 5. The tightening tool 8 is then engaged in the recess made in the head 61 of the fastening screw 6, then driven in rotation by the electric motor 830, which in turn drives the fastening screw 6 in rotation.

The portable tool with manual control 500 according to the invention also comprises a system for measuring the tightening torque 860 applied to the fastening screw 6 during the implementation of the tightening method as described above, that is to say, a system for measuring the tightening torque 605 developed by the tightening tool 8. Such a system for measuring the tightening torque is for example mechanical or electrical. It may be a torque measuring device. It may also be a device for measuring the current consumed by the electric motor 830.

The portable tool with manual control 500 according to the invention also comprises a stoppage device 870 for the tightening tool 8 as a function of the measured tightening torque, in particular when the stoppage value shown in FIG. 3 or 4 appears. For example, this stoppage device 870 can be mechanical and perform a mechanical blocking of the tightening device 800, or even a disengagement between the electric motor 830 and the tightening tool 8 preventing any rotation of the tightening tool 8.

This stoppage device 870 can also be electric. According to this example, it is an electrical switch which interrupts the electrical power supply to the electric motor 830 upon receipt of the screwing stoppage instruction from the torque measuring system 860.

FIG. 9 illustrates a second embodiment which implements the invention. This is a screwing robot 501 which comprises a tightening device 800 configured to implement a tightening method as described above.

With reference to this figure, the screwing robot 501 comprises at least one base 801 which is intended to be secured to the ground, as well as an arm 802 equipped with a screwing head 80, which in turn carries a tightening tool 8 as previously defined. Analogously to the example illustrated by FIG. 8, the screwing head 80 is advantageously configured to receive tightening tools 8 of different shapes in order to implement the method according to the invention for different shapes of recesses made in the head 61 of the fastening screw 6, not shown in FIG. 9.

The movements of the screwing robot 501 here are governed by an electronic control unit 805 configured in particular to control the movements of the aforementioned arm 802, as well as the movements of the tightening tool 8, in particular the rotation of the latter by an electric motor 830 that the screwing robot 501 comprises.

Like for the embodiment of FIG. 8, the screwing robot 501 comprises a stoppage device 870 for the tightening tool 8 as a function of the measured tightening torque. For example, this stoppage device 870 can be mechanical and perform a mechanical blocking of the tightening device 800, or even a disengagement between the electric motor 830 and the tightening tool 8 preventing any rotation of the tightening tool 8.

This stoppage device 870 can also be electric. According to this example, it is an electrical switch which interrupts the electrical power supply to the electric motor 830 upon receipt of the screwing stoppage instruction from the torque measuring system 860.

To prevent certain tightening defects from occurring, the tightening device 800 advantageously comprises a damping system 85 and a thrust plate 852, more particularly illustrated in FIG. 10.

With reference to this FIG. 10, the damping system 85 in particular comprises a translation motor 851 of the tightening tool 8, as well as two threaded rods 853 which are arranged symmetrically with respect to the axis of rotation 850 of the tightening tool 8, and at least one spring 855 interposed between the thrust plate 852 and the screwing head 80. The translation motor 851 of the tightening tool 8 is, for example, an electric motor supplied with current by a domestic network or by an electrical storage device on board the tightening device 800 according to the invention.

The threaded rods 853 are substantially parallel to each other and to the axis of rotation 850 of the tightening tool 8, and they have an axis of revolution 854 in the direction of which they extend. The threaded rods 853 are linked to the translation motor 851 of the tightening tool 8 by a system of gears 857 schematically illustrated in FIG. 10. The threaded rods 853 are thus driven in rotation about their axes of rotation 854 by the translation motor 851, via the gear system 857.

The thrust plate 852 is a substantially flat part, linked to the aforementioned threaded rods 853. According to the embodiment more precisely illustrated by FIG. 10, the thrust plate 852 is pierced with two orifices which are arranged symmetrically with respect to the aforementioned axis of rotation 850 and by which it is linked to the threaded rods 853. It therefore follows from the foregoing that, when the threaded rods 853 are driven in rotation about their axes of rotation 854 by the translation motor 851, the thrust plate 852 moves in translation in the common direction of the axis of rotation 850 of the tightening tool 8 and of the axes of rotation 854 of the threaded rods 853. More precisely, the damping system 85 is configured so that the thrust plate 852 moves in translation in the direction illustrated by the double arrow F in FIG. 10, that is to say, from or toward the screwing head 80 of the tightening tool 8.

The screwing head 80 of the tightening tool 8, coaxial with the tightening tool 8, advantageously comprises a rotation motor 858 of the tightening tool 8, schematically shown in FIG. 10, and it is freely passed through by the threaded rods 853 described above. The rotation motor 858 of the tightening tool 8 is, for example, an electric motor supplied with current by a domestic network or by an electrical storage device on board the tightening device 800 according to the invention.

At least one spring 855 is interposed between the screwing head 80 and the thrust plate 852. According to the embodiment more precisely illustrated by FIG. 10, a spring 855 is placed around each threaded rod 853, and it is interposed between an upper face 805 of the screwing head 80 and a lower face 8520 of the thrust plate 852.

When tightening a fastening screw 6 in the construction panel 4, the screwing head 80, under the effect of the progression of the fastening screw 6 in the construction panel 4, is driven in translation, along the direction of the axis of rotation 850 of the tightening tool 8, toward the exposed face 44 of the construction panel 4.

Concomitantly, the translation motor 851 of the tightening tool 8 drives the threaded rods 853 in rotation simultaneously with the rotation of the fastening screw 6 driven by the rotation motor 858 of the tightening tool 8. Driven in translation in the direction illustrated by arrow F, the thrust plate 852 then exerts a uniform thrust force on the upper face 805 of the screwing head 80 by means of the springs 855. The aforementioned damping system 85 is thus configured to absorb a difference between the speed of translation of the thrust plate 852 and the speed of progression of the fastening screw 6 within the construction panel 4 and the support 5.

If the progression of the fastening screw 6 within the construction panel 4 is momentarily stopped, for example in the event of momentary blocking of the fastening screw 6 in the construction panel 4, for example during any of the steps of the method, the translation of the screwing head 80 in the direction of the exposed face 44 of the construction panel 4 is momentarily stopped. As the thrust force described above continues, the springs 855 are progressively compressed between the upper face 805 of the screwing head 80 and the lower face 8520 of the thrust plate 852. The thrust force that they exert on the screwing head 80 then increases, facilitating the release of the fastening screw 6 while keeping the rotation of the latter at the constant speed of rotation of the tightening tool 8.

Conversely, if the progression of the fastening screw within the construction panel 4 is momentarily accelerated, for example if the fastening screw 6 is in a region of lower density of the construction panel 4 and/or of the material making up the support 5 of the construction panel 4, the screwing head 80 moves toward the exposed face 44 of the construction panel 4 faster than the thrust plate 852. The springs 855 then decompress, while maintaining a thrust force on the screwing head 80 that is sufficient to guarantee permanent contact between the tightening tool 8 and the head 61 of the fastening screw 6.

The aforementioned spring or springs 855 therefore make it possible to compensate for any variations in the speed of progression of the fastening screw 6 in the construction panel 4 and/or in the support 5 of the latter. The damping system 85 thus makes it possible to avoid any loss of contact between the tightening tool 8 and the head 61 of the fastening screw 6.

FIG. 11 illustrates an automated device 9 according to the invention, configured to move autonomously against a construction panel and to implement the method according to the invention previously described in order to fasten the configuration panel in question on a support of the construction panel.

With reference to FIG. 11, the automated device 9 according to the invention comprises a frame 90 which has a generally substantially rectangular shape extending in a main direction of elongation X, or longitudinal direction of the automated device 9. With reference to the aforementioned main direction of elongation X, a transverse direction Y of the automated device 9 is defined, perpendicular to the aforementioned main direction of elongation X, and a vertical direction Z perpendicular to the plane defined by the longitudinal direction X and by the aforementioned transverse direction Y, such that the directions (X, Y, Z) form a direct trihedron. With reference to this direct trihedron (X, Y, Z), the frame 90 extends substantially mainly in a plane defined by the longitudinal direction X and by the transverse direction Y.

As illustrated in FIG. 11, the frame 90 of the automated device 9 comprises a central part 900 in particular carrying a tightening device 800 configured to implement the method according to the invention, and two platforms 91 arranged on both sides of the central part 900. In other words, the automated device 9 comprises, in this order and along its extension axis X, a first platform 91, the central part 900 and a second platform 91.

As shown in FIG. 11, the platforms 91 are interconnected by at least one reinforcement 910, advantageously two parallel reinforcements 910 arranged on either side of the tightening device 800. More particularly, these reinforcements 910 extend in two directions parallel to the extension axis X of the frame 90, and they are advantageously configured, on the one hand, to improve the strength of the automated device 9 and, on the other hand, to stiffen the frame 90 as a whole.

A platform 91 comprises a plate 92, at least one means 93 for setting the automated device 9 in motion, and a retaining member. According to the example illustrated in this figure, the member for retaining the automated device 9 against the construction panel takes the form of a suction member 94. The plate 92 is provided with a passage through which the air is sucked in order to generate a vacuum. The plate 92 comprises an outer peripheral strip where a sealing device 95 is arranged. The space between the plate 92, the construction panel, not shown in FIG. 11, and the sealing device 95 forms a vacuum chamber, the latter having a suction mouth intended to be positioned against the construction panel.

The suction member 94 comprises the sealing device 95 which, together with the aforementioned plate 92, delimits the vacuum chamber where the vacuum takes place in order to retain the automated device 9 against the construction panel.

The suction member 94 also comprises a means for placing the vacuum chamber under vacuum, which forms the element generating the vacuum in the vacuum chamber. By way of example, this depressurization means, not visible in FIG. 11, takes the form of a propeller rotated by an electric motor on the shaft of which the propeller is placed.

According to the embodiment more particularly illustrated by FIG. 11, the automated device 9 comprises two suction members 94 arranged on either side of the tightening device 800, in the longitudinal direction X of the automated device 9 according to the invention.

The sealing device 95 is configured to participate simultaneously in the vacuum generated by the suction member 94 and in the movements of the automated device 9 against the construction panel. The sealing device 95 may be a seal made of a material specifically chosen for its mechanical properties or treated to give it the desired mechanical properties, for example by an appropriate surface treatment or by the addition of a film of a specific material chosen for its mechanical properties. The mechanical properties more specifically sought in the context of the sealing device 95 are, in particular, friction properties, the sealing having to be maintained when the automated device 9 according to the invention moves against a face of the construction panel.

It follows from the foregoing that the suction member 94 and its sealing device 95 allow that, in all the spatial positions of the automated device 9, the latter moves against an exposed face of the construction panel, autonomously, and while remaining in permanent contact with the face on which it is moving.

The automated device 9 simultaneously implements the member for retaining the automated device 9 against the construction panel and the means 93 for setting the automated device 9 in motion. This means for setting in motion 93 comprises at least one electric motor associated with a wheel 96. By way of non-exclusive example, the electric motor is for example supplied with current by a domestic electrical network or by an energy source on board the frame 90, such as an electrical storage device.

As shown in FIG. 11, the frame 90 carries four wheels 96 which are distributed symmetrically around the periphery of the frame 90. The four wheels 96 allow the movements of the automated device 9 and its guidance during these movements. More specifically, the wheels 96 allow the movement of the automated device 9 against the exposed face of the construction panel.

Advantageously, the automated device 9 comprises a control unit 950 configured to control the operation of the electric movement motor, the operation of the member for retaining the automated device 9 against the construction panel, as well as the operation of the tightening device 800. According to various embodiments, the control unit 950, schematically shown in FIG. 11, can be mounted on the frame 90 of the automated device 9.

With reference to FIG. 11, the automated device 9 comprises the tightening device 800 configured to implement the method according to the invention described above. According to the embodiment more particularly illustrated by FIG. 11, the tightening device 800 is placed in a substantially central position of the frame 90, that is to say, on the central part 900 of the automated device 9. In this particular example, the tightening device 800 extends mainly in a direction Z of extension perpendicular to the plane in which at least one of the plates 92 of the frame 90 extends.

The tightening device 800 illustrated in FIG. 11 comprises, in addition to a screwing head 80 equipped with a tightening tool 8 as defined above, a damping system 85 and a thrust plate 852 as described in connection with FIG. 10. Reference is made to the description of this FIG. 10, which applies mutatis mutandis to the damping system 85 which equips the automated device 9 of FIG. 11.

According to this embodiment, a stem 970 of the automated device 9 supports and stiffens the aforementioned damping system 85. The stem 970 comprises two guide pins 971 arranged symmetrically on either side of the axis of rotation 850 of the tightening tool 8, not aligned with the threaded rods 853 described above, for a better balance of the assembly.

Advantageously, the control unit 950 is configured to control the operation of the tightening device 800, as well as the operation of the damping system 85.

The automated device 9 comprises a stoppage device 870 for the tightening tool 8 as a function of the measured tightening torque. For example, this stoppage device 870 can be mechanical and perform a mechanical blocking of the tightening device 800, or even a disengagement between the electric motor 830 and the tightening tool 8 preventing any rotation of the tightening tool 8.

This stoppage device 870 can also be electric. According to this example, it is an electrical switch which interrupts the electrical power supply to the electric motor 830 upon receipt of the screwing stoppage instruction from the torque measuring system 860. In such a case, the stoppage device 870 can be housed in the control unit 950.

As it has just been described, the invention does indeed achieve the goals it had set itself, by allowing reliable, reproducible and defect-free tightening of a screw for fastening a construction panel to its support.

The invention cannot, however, be limited to the means and configurations exclusively described and illustrated, and also applies to all equivalent means or configurations and to any combination of such means or configurations. In particular, while the invention has been described here in its application to a substantially parallelepipedal construction panel, it goes without saying that it applies to any shape and/or dimension of construction panel.

The invention claimed is:

1. A method for tightening a screw for fastening a construction panel to a support of the construction panel, in which the fastening screw is screwed through the construction panel and then through at least part of the support, the method comprising:
    monitoring a change over time of a tightening torque of the fastening screw, with determination of a first maximum torque value and then of a second minimum torque value, and
    after determining the second minimum torque value, stopping the tightening of the fastening screw for a torque stoppage value, greater than the first maximum torque value, the torque stoppage value corresponding to a third maximum torque value or being determined after an occurrence of a third maximum torque value.

2. The method according to claim 1, wherein the torque stoppage value is representative of a position where an upper surface of a head of the fastening screw is coplanar with a main face delimiting the construction panel or included in the construction panel.

3. The method according to claim 1, wherein the torque stoppage value is calculated and/or determined beforehand by testing.

4. The method according to claim 1, wherein the torque stoppage value is part of a decreasing phase of the tightening torque, such a decreasing phase of the tightening torque being after the third maximum torque value.

5. The method according to claim 1, wherein the torque stoppage value is part of an increasing phase of the tightening torque, such an increasing phase of the tightening torque being after the third maximum torque value, the torque stoppage value being less than or equal to the third maximum torque value.

6. The method according to claim 1, where the determination of the first maximum torque value and/or of the second minimum torque value is done by subtracting two successive torque values.

7. A tightening device for a fastening screw intended to fasten a construction panel on a support of the construction panel, the tightening device comprising a tightening tool configured to implement a method of tightening the fastening screw according to claim 1, the tightening device being equipped with a system for measuring the tightening torque applied to the fastening screw and a device for stopping the tightening tool according to the measured tightening torque.

8. The tightening device according to claim 7, wherein the system for measuring the torque of the tightening tool comprises at least one means for detecting the first maximum torque value and/or the second minimum torque value and/or a third maximum torque value.

9. The tightening device according to claim 7, comprising a damping system configured to compensate for variations in a speed of movement of a thrust plate constituting the tightening device.

10. The tightening device according to claim 9, wherein the damping system comprises at least one threaded rod driven in rotation by a translation motor of the tightening tool, the threaded rod being configured to drive the thrust plate in translation in a direction substantially parallel to an axis of rotation of the tightening tool, the damping system comprising at least one spring disposed between the thrust plate and the tightening tool.

11. A portable tool with manual control comprising a tightening device according to claim 7.

12. A screwing robot comprising a tightening device according to claim 7, the screwing robot comprising a base configured to be secured to a floor and equipped with an arm at one end of which the tightening tool is placed, the movements of the tightening tool and of the arm which carries it being governed by an electronic control unit.

13. An automated device configured to move resting on a construction panel, the automated device comprising a frame carrying a tightening device according to claim 7, configured to perform at least one operation of fastening the construction panel on a support thereof, the automated device comprising at least one member for retaining the automated device against the construction panel and at least one means for setting the automated device in motion along the construction panel.

* * * * *